United States Patent
Lovell et al.

(10) Patent No.: US 11,610,095 B2
(45) Date of Patent: Mar. 21, 2023

(54) SYSTEMS AND METHODS FOR ENERGY-EFFICIENT DATA PROCESSING

(71) Applicant: Maxim Integrated Products, Inc., San Jose, CA (US)

(72) Inventors: Mark Alan Lovell, Lucas, TX (US); Robert Michael Muchsel, Addison, TX (US); Donald Wood Loomis, III, Coppell, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 600 days.

(21) Appl. No.: 16/590,265

(22) Filed: Oct. 1, 2019

(65) Prior Publication Data

US 2020/0110979 A1 Apr. 9, 2020

Related U.S. Application Data

(60) Provisional application No. 62/740,700, filed on Oct. 3, 2018.

(51) Int. Cl.
*G06N 3/04* (2006.01)
*G06N 3/063* (2006.01)

(52) U.S. Cl.
CPC ............ *G06N 3/04* (2013.01); *G06N 3/0635* (2013.01)

(58) Field of Classification Search
CPC .......... G06N 3/04; G06N 3/0635; G06N 3/063
See application file for complete search history.

(56) References Cited

U.S. PATENT DOCUMENTS

2017/0103304 A1\* 4/2017 Henry ...................... G06N 3/04
2018/0121796 A1\* 5/2018 Deisher ................ G06N 3/0472

OTHER PUBLICATIONS

Imani, Mohsen, et al. "Efficient neural network acceleration on gpgpu using content addressable memory." Design, Automation & Test in Europe Conference & Exhibition (DATE), 2017. IEEE, 2017. (Year: 2017).\*

St. Amant, Renee, et al. "General-purpose code acceleration with limited-precision analog computation." Acm Sigarch Computer Architecture News 42.3 (2014): 505-516. (Year: 2014).\*

\* cited by examiner

*Primary Examiner* — Benjamin P Geib

(74) *Attorney, Agent, or Firm* — North Weber & Baugh LLP; Michael North

(57) ABSTRACT

An energy-efficient sequencer comprising inline multipliers and adders causes a read source that contains matching values to output an enable signal to enable a data item prior to using a multiplier to multiply the data item with a weight to obtain a product for use in a matrix-multiplication in hardware. A second enable signal causes the output to be written to the data item.

20 Claims, 17 Drawing Sheets

100

| Read Source | Data | Weight | Write Target | |
|---|---|---|---|---|
| 1.1 | 0.0 | -0.002849 | 0.1 | |
| 1.1 | 0.0 | -0.017828 | 0.2 | |
| 1.1 | 0.0 | -0.009457 | 0.3 | |
| 1.1 | 0.0 | 0.002599 | 0.4 | |
| 1.1 | 1.000 | 1.164915 | 0.0 | *bias* |
| 1.2 | 0.0 | -0.001750 | 0.1 | |
| 1.2 | 0.0 | 0.002224 | 0.2 | |
| 1.2 | 0.0 | -0.302871 | 0.3 | |
| 1.2 | 0.0 | 0.003136 | 0.4 | |
| 1.2 | 1.000 | 0.362173 | 0.0 | *bias* |
| 1.3 | 0.0 | 0.014005 | 0.1 | |
| 1.3 | 0.0 | -0.004803 | 0.2 | |
| 1.3 | 0.0 | 0.006862 | 0.3 | |
| 1.3 | 0.0 | -0.000359 | 0.4 | |
| 1.3 | 1.000 | -0.061022 | 0.0 | *bias* |
| 2.1 | 0.0 | 0.013358 | 1.1 | |
| 2.1 | 0.0 | 0.336068 | 1.2 | |
| 2.1 | 0.0 | 0.053273 | 1.3 | |
| 2.1 | 1.000 | -0.147177 | 0.0 | *bias* |
| 2.2 | 0.0 | 0.060003 | 1.1 | |
| 2.2 | 0.0 | 0.061367 | 1.2 | |
| 2.2 | 0.0 | 0.035826 | 1.3 | |
| 2.2 | 1.000 | 0.259385 | 0.0 | *bias* |
| 3.1 | 0.0 | 0.002278 | 2.1 | |
| 3.1 | 0.0 | -0.208623 | 2.2 | |
| 3.1 | 1.000 | -0.129340 | 0.0 | *bias* |
| 3.2 | 0.0 | -0.010056 | 2.1 | |
| 3.2 | 0.0 | -0.508784 | 2.2 | |
| 3.2 | 1.000 | 0.021406 | 0.0 | *bias* |
| 3.3 | 0.0 | -0.014962 | 2.1 | |
| 3.3 | 0.0 | -0.723387 | 2.2 | |
| 3.3 | 1.000 | -0.100748 | 0.0 | *bias* |
| 4.1 | 0.0 | 1.000 | 3.1 | *first output* |
| 4.2 | 0.0 | 1.000 | 3.2 | *second output* |
| 4.3 | 0.0 | 1.000 | 3.3 | *third output* |

| Read Source | Data | Weight | Write Target |
|---|---|---|---|
| 1.1 | 0.41 | -0.002849 | 0.1 |
| 1.1 | 0.52 | -0.017828 | 0.2 |
| 1.1 | 0.63 | -0.009457 | 0.3 |
| 1.1 | 0.74 | 0.002599 | 0.4 |
| 1.1 | 1.000 | 1.164915 | 0.0 |
| 1.2 | 0.41 | -0.001750 | 0.1 |
| 1.2 | 0.52 | 0.002224 | 0.2 |
| 1.2 | 0.63 | -0.302871 | 0.3 |
| 1.2 | 0.74 | 0.003136 | 0.4 |
| 1.2 | 1.000 | 0.362173 | 0.0 |
| 1.3 | 0.41 | 0.014005 | 0.1 |
| 1.3 | 0.52 | -0.004803 | 0.2 |
| 1.3 | 0.63 | 0.006862 | 0.3 |
| 1.3 | 0.74 | -0.000359 | 0.4 |
| 1.3 | 1.000 | -0.061022 | 0.0 |
| 2.1 | 0.483156 | 0.013358 | 1.1 |
| 2.1 | 0.0 | 0.336068 | 1.2 |
| 2.1 | 0.0 | 0.053273 | 1.3 |
| 2.1 | 1.000 | -0.147177 | 0.0 |
| 2.2 | 0.483156 | 0.060003 | 1.1 |
| 2.2 | 0.0 | 0.061367 | 1.2 |
| 2.2 | 0.0 | 0.035826 | 1.3 |
| 2.2 | 1.000 | 0.259385 | 0.0 |
| 3.1 | 0.0 | 0.002278 | 2.1 |
| 3.1 | 0.0 | -0.208623 | 2.2 |
| 3.1 | 1.000 | -0.129340 | 0.0 |
| 3.2 | 0.0 | -0.010056 | 2.1 |
| 3.2 | 0.0 | -0.508784 | 2.2 |
| 3.2 | 1.000 | 0.021406 | 0.0 |
| 3.3 | 0.0 | -0.014962 | 2.1 |
| 3.3 | 0.0 | -0.723387 | 2.2 |
| 3.3 | 1.000 | -0.100748 | 0.0 |
| 4.1 | 0.0 | 1.000 | 3.1 |
| 4.2 | 0.0 | 1.000 | 3.2 |
| 4.3 | 0.0 | 1.000 | 3.3 |

FIGURE 7

| Encoding | 111 (7) | 110 (6) | 101 (5) | 000 (0) | 001 (1) | 010 (2) | 011 (3) |
|---|---|---|---|---|---|---|---|
| Value | −1.0 | −0.7 | −0.35 | 0.0 | 0.35 | 0.7 | 1.0 |

1000

| Read Source | Data | Weight | Write Target |
|---|---|---|---|
| 1.1 | 0.0 | 0.0 | 0.1 |
| 1.1 | 0.0 | 0.0 | 0.2 |
| 1.1 | 0.0 | 0.0 | 0.3 |
| 1.1 | 0.0 | 0.0 | 0.4 |
| 1.1 | 1.000 | 1.0 | 0.0 |
| 1.2 | 0.0 | 0.0 | 0.1 |
| 1.2 | 0.0 | 0.0 | 0.2 |
| 1.2 | 0.0 | -0.35 | 0.3 |
| 1.2 | 0.0 | 0.0 | 0.4 |
| 1.2 | 1.000 | 0.35 | 0.0 |
| 1.3 | 0.0 | 0.0 | 0.1 |
| 1.3 | 0.0 | 0.0 | 0.2 |
| 1.3 | 0.0 | 0.0 | 0.3 |
| 1.3 | 0.0 | 0.0 | 0.4 |
| 1.3 | 1.000 | 0.0 | 0.0 |
| 2.1 | 0.0 | 0.0 | 1.1 |
| 2.1 | 0.0 | 0.35 | 1.2 |
| 2.1 | 0.0 | 0.0 | 1.3 |
| 2.1 | 1.000 | 0.0 | 0.0 |
| 2.2 | 0.0 | 0.0 | 1.1 |
| 2.2 | 0.0 | 0.0 | 1.2 |
| 2.2 | 0.0 | 0.0 | 1.3 |
| 2.2 | 1.000 | 0.35 | 0.0 |
| 3.1 | 0.0 | 0.0 | 2.1 |
| 3.1 | 0.0 | -0.35 | 2.2 |
| 3.1 | 1.000 | 0.0 | 0.0 |
| 3.2 | 0.0 | 0.0 | 2.1 |
| 3.2 | 0.0 | -0.7 | 2.2 |
| 3.2 | 1.000 | 0.0 | 0.0 |
| 3.3 | 0.0 | 0.0 | 2.1 |
| 3.3 | 0.0 | -0.7 | 2.2 |
| 3.3 | 1.000 | 0.0 | 0.0 |
| 4.1 | 0.0 | 1.000 | 3.1 |
| 4.2 | 0.0 | 1.000 | 3.2 |
| 4.3 | 0.0 | 1.000 | 3.3 |

| Read Source | Data | Weight | Write Target |
|---|---|---|---|
| 1.1 | 1.000 | 1.0 | 0.0 |
| 1.2 | 0.0 | -0.30 | 0.3 |
| 1.2 | 1.000 | 0.35 | 0.0 |
| 2.1 | 0.0 | 0.35 | 1.2 |
| 2.2 | 1.000 | 0.35 | 0.0 |
| 3.1 | 0.0 | -0.35 | 2.2 |
| 3.2 | 0.0 | -0.7 | 2.2 |
| 3.3 | 0.0 | -0.75 | 2.2 |
| 4.1 | 0.0 | 1.000 | 3.1 |
| 4.2 | 0.0 | 1.000 | 3.2 |
| 4.3 | 0.0 | 1.000 | 3.3 |

| Read Source | Data | Weight j,k+0 | Weight j,k+1 | Write Target | |
|---|---|---|---|---|---|
| 1.1/1.2 | 0.0 | -0.002849 | -0.001750 | 0.1 | |
| 1.1/1.2 | 0.0 | -0.017828 | 0.002224 | 0.2 | |
| 1.1/1.2 | 0.0 | -0.009457 | -0.302871 | 0.3 | |
| 1.1/1.2 | 0.0 | 0.002599 | 0.003136 | 0.4 | |
| 1.1/1.2 | 1.000 | 1.164915 | 0.362173 | 0.0 | *bias* |
| 1.3/1.4 | 0.0 | 0.014005 | 0.0 | 0.1 | |
| 1.3/1.4 | 0.0 | -0.004803 | 0.0 | 0.2 | |
| 1.3/1.4 | 0.0 | 0.006862 | 0.0 | 0.3 | |
| 1.3/1.4 | 0.0 | -0.000359 | 0.0 | 0.4 | |
| 1.3/1.4 | 1.000 | -0.061022 | 0.0 | 0.0 | *bias* |
| 2.1/2.2 | 0.0 | 0.013358 | 0.060003 | 1.1 | |
| 2.1/2.2 | 0.0 | 0.336068 | 0.061367 | 1.2 | |
| 2.1/2.2 | 0.0 | 0.053273 | 0.035826 | 1.3 | |
| 2.1/2.2 | 1.000 | -0.147177 | 0.259385 | 0.0 | *bias* |
| 3.1/3.2 | 0.0 | 0.002278 | -0.010056 | 2.1 | |
| 3.1/3.2 | 0.0 | -0.208623 | -0.508784 | 2.2 | |
| 3.1/3.2 | 1.000 | -0.129340 | 0.021406 | 0.0 | *bias* |
| 3.3/3.4 | 0.0 | -0.014962 | 0.0 | 2.1 | |
| 3.3/3.4 | 0.0 | -0.723387 | 0.0 | 2.2 | |
| 3.3/3.4 | 1.000 | -0.100748 | 0.0 | 0.0 | *bias* |
| 4.1/4.2 | 0.0 | 1.000 | 0.0 | 3.1 | *first output* |
| 4.3/4.4 | 0.0 | 1.000 | 0.0 | 3.2 | *second output* |
| 4.5/4.6 | 0.0 | 1.000 | 0.0 | 3.3 | *third output* |

| Read Source | Data | Weight | Write Target |
|---|---|---|---|
| 22 | 0.0 | 0.35 | 12 |
| 22 | 0.0 | 0.35 | 14 |
| 23 | 0.0 | 0.35 | 12 |
| 23 | 0.0 | -0.7 | 13 |
| 23 | 0.0 | -0.75 | 14 |
| 24 | 0.0 | 0.35 | 12 |
| 24 | 0.0 | 1.000 | 13 |
| 24 | 0.0 | -0.75 | 14 |
| 25 | 0.0 | 0.35 | 12 |
| 25 | 0.0 | -0.7 | 13 |
| 25 | 0.0 | -0.75 | 14 |

| Read Source | Data | Weight | Write Target |
|---|---|---|---|
| 22 (100010) | 0.0 | 0.35 | 12 |
| 23 (100011) | 0.0 | 0.35 | 12 |
| 24 (100100) | 0.0 | 0.35 | 12 |
| 25 (100101) | 0.0 | 0.35 | 12 |
| 23 (100011) | 0.0 | -0.7 | 13 |
| 25 (100101) | 0.0 | -0.7 | 13 |
| 24 (100100) | 0.0 | 1.000 | 13 |
| 23 (100011) | 0.0 | -0.75 | 14 |
| 24 (100100) | 0.0 | -0.75 | 14 |
| 25 (100101) | 0.0 | -0.75 | 14 |
| 22 (100010) | 0.0 | 0.35 | 14 |

| Read Source | Data | Weight | Write Target |
|---|---|---|---|
| 10001X | 0.0 | 0.35 | 12 |
| 10010X | 0.0 | 0.35 | 12 |
| 1001X1 | 0.0 | -0.7 | 13 |
| 100100 | 0.0 | 1.000 | 13 |
| 100011 | 0.0 | -0.75 | 14 |
| 10010X | 0.0 | -0.75 | 14 |
| 100010 | 0.0 | 0.35 | 14 |

FIGURE 15

SYSTEMS AND METHODS FOR ENERGY-EFFICIENT DATA PROCESSING

CROSS-REFERENCE TO RELATED APPLICATIONS

The present application claims priority benefit, under 35 U.S.C. § 119(e), to co-pending and commonly-assigned U.S. provisional patent application No. 62/740,700, entitled "Systems and Methods for Energy-Efficient Data Processing," naming as inventors Mark Alan Lovell, Robert Michael Muchsel, and Donald Wood Loomis III, and filed Oct. 3, 2018, which application is herein incorporated by reference as to its entire content. Each reference mentioned in this patent document is incorporated by reference herein in its entirety.

TECHNICAL FIELD

The present disclosure relates generally to data processing. More particularly, the present disclosure relates to systems and methods for improving utilization of computing and memory resources when performing arithmetic operations, such as matrix multiplications.

BACKGROUND

Machine Learning is an exciting area of research and development that enables computation of algorithms and solutions previously infeasible in "classic" computing. However, most existing implementations make use of general-purpose CPUs or graphics processing units (GPUs). While delivering correct and satisfactory results in many cases, the energy needs of such implementations oftentimes preclude the use of computationally challenging machine learning algorithms in constrained environments such as battery operated sensors, small microcontrollers, and the like.

This is mainly due to the fact that arithmetic operations are typically performed in software that operates on a general-purpose computing device, such as a conventional microprocessor. This approach is very costly in terms of both power and time, and for many computationally intensive applications (e.g., real-time applications) general hardware is unable to perform the necessary operations in a timely manner as the rate of calculations is limited by the computational resources and capabilities of existing hardware designs.

Further, using a general processor's arithmetic functions to generate intermediate results comes at the expense of computing time due to the added steps of storing and retrieving intermediate results from various memory locations to complete an operation. For example, many conventional multipliers are scalar machines that use a CPU or GPU as their computation unit and use registers and a cache to process data stored in memory relying on a series of software and hardware matrix manipulation steps, such as address generation, transpositions, bit-by-bit addition and shifting, converting multiplications into additions and outputting the result into some internal register.

Furthermore, computationally demanding applications such as convolutions oftentimes require a software function be embedded in the microprocessor and be used to convert convolution operations into alternate matrix-multiply operations. This involves rearranging and reformatting image data and weight data into two matrices that then are raw matrix-multiplied. There exist no mechanisms that efficiently select, use, and reuse data, while avoiding to generate redundant data. Software must access the same locations of a standard memory and read, re-fetch, and write the same data over and over again when performing multiplication and other operations, which is computationally very burdensome and creates a bottleneck that curbs the usability of machine learning applications.

As the amount of data subject to matrix multiplication operations increases and the complexity of operations continues to grow, the inability to reuse much of the data coupled with the added steps of storing and retrieving intermediate results from memory to complete an arithmetic operation present only some of the shortcomings of existing designs. Therefore, conventional hardware and methods are not well-suited for the ever-increasing demands for speed and the performance that are required to perform a myriad of complex processing steps involving large amounts of data in real-time.

Accordingly, what is needed are high-computational-throughput systems and methods that move and process data in a rapid and energy-efficient manner to drastically reduce the number of arithmetic operations and storage requirements, e.g., for relatively small computing devices that can take advantage of and integrate machine learning processes without undue energy burden or excessive hardware cost.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures may be not to scale.

FIG. 5 is a tabular listing of exemplary contents of a memory structure according to various embodiments of the present disclosure, such as the memory structure shown in FIG. 2.

FIG. 7 illustrates an exemplary tabular listing for FIG. 5 after activated computations are stored.

FIG. 10 illustrates an exemplary tabular listing for FIG. 5 after rounding.

FIG. 11 illustrates a simplified example of rounding results according to various embodiments of the present disclosure.

FIG. 12 illustrates an exemplary tabular listing for weight sharing according to various embodiments of the present disclosure.

FIG. 13 illustrates an exemplary tabular listing for combining entries according to various embodiments of the present disclosure.

FIG. 14 illustrates the table in FIG. 13 after sorting and adding a binary representation according to various embodiments of the present disclosure.

FIG. 15 illustrates the table in FIG. 14 after replacing Read Source address bits, according to various embodiments of the present disclosure.

DETAILED DESCRIPTION OF EMBODIMENTS

Figure 1:
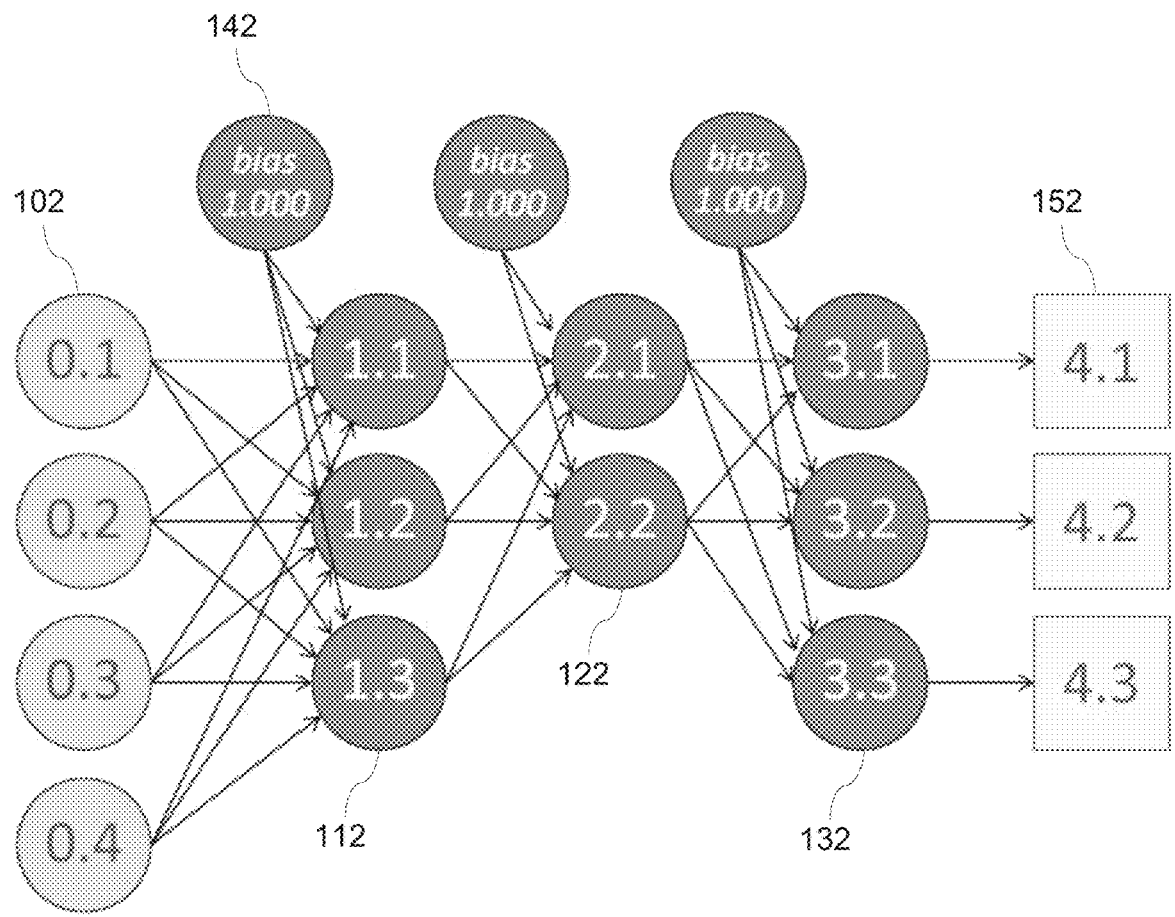
FIG. 1 is a general illustration of a simplified prior art fully connected network.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

In this document, the terms "in-line," "in place," and "local" are used interchangeably. Furthermore, the terms "include," "including," "comprise," and "comprising," shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

It is noted that embodiments described herein are given in the context of machine learning, but one skilled in the art shall recognize that the teachings of the present disclosure are not limited to machine learning hardware and may be applied to various other networks and applications that involve arithmetic operations that may be used in other contexts. For example, although embodiments herein are discussed mainly in the context of convolutions, a person of skill in the art will appreciate that a deconvolution operation can also be structured as matrix-matrix type multiply operation and, thus, the principles of the present invention are equally applicable to deconvolutions. Furthermore, other types of mathematical operations may be implemented in accordance with various embodiments of this disclosure.

Similarly, embodiments herein are discussed mainly in the context of fully connected layers. Yet, one of skill in the art will appreciate that this does not limit this invention to this particular type of neural network; rather, the teachings of the present invention may be equally applied to other types of networks, such as image processing applications that use in accelerators for convolutions and deconvolutions.

A. Fully Connected Networks

Most machine learning processes make use of so-called "fully-connected layers" and sub-layers. Some neural networks exclusively use fully connected layers, while others make at least partial use of them. FIG. 1 is a general illustration of a simplified prior art fully connected network.

Network 100 has four inputs 102 (denoted as 0.1, 0.2, 0.3, and 0.4), three hidden layers 112-132 (having neurons denoted as 1.1, 1.2, 1.3, 2.1, 2.2, 3.1, 3.2, and 3.3), and three outputs 152 (denoted as 4.1, 4.2, 4.3). It is pointed out that the diagram in FIG. 1 is used only for demonstration purposes and ease of illustration; practical machine learning models may operate on anywhere from hundreds to more than millions of neurons.

As is known in the art, processing a machine learning algorithm entails a great number of matrix multiplication steps. In the example shown in FIG. 1, e.g., the output y1.1 of neuron 1.1 is calculated as:

$$y_{1.1} = g(\Sigma_i x_i \cdot w_i) \qquad \text{(Eq. 1)}$$

yielding  $y_{1.1} = g(x_{0.1} \cdot w_{0.1} + x_{0.2} \cdot w_{0.2} + x_{0.3} \cdot w_{0.3} + x_{0.4} \cdot w_{0.4} + b_1)$, where g is the activation function, $x_i$ are data elements, $w_i$ are weights and $b_1$ is a bias value.

As will be understood by a person of skill in the art, the larger network 100, the larger the number of required multiplications and, thus, the energy impact will follow $O(n^2)$, where n represents the number of neurons in the network. Therefore, reducing the energy impact of arithmetic operations, such as multiplications and additions, should be of utmost importance when designing low-power machine learning and similar applications.

B. Memory Structure and Addressability

Figure 2:
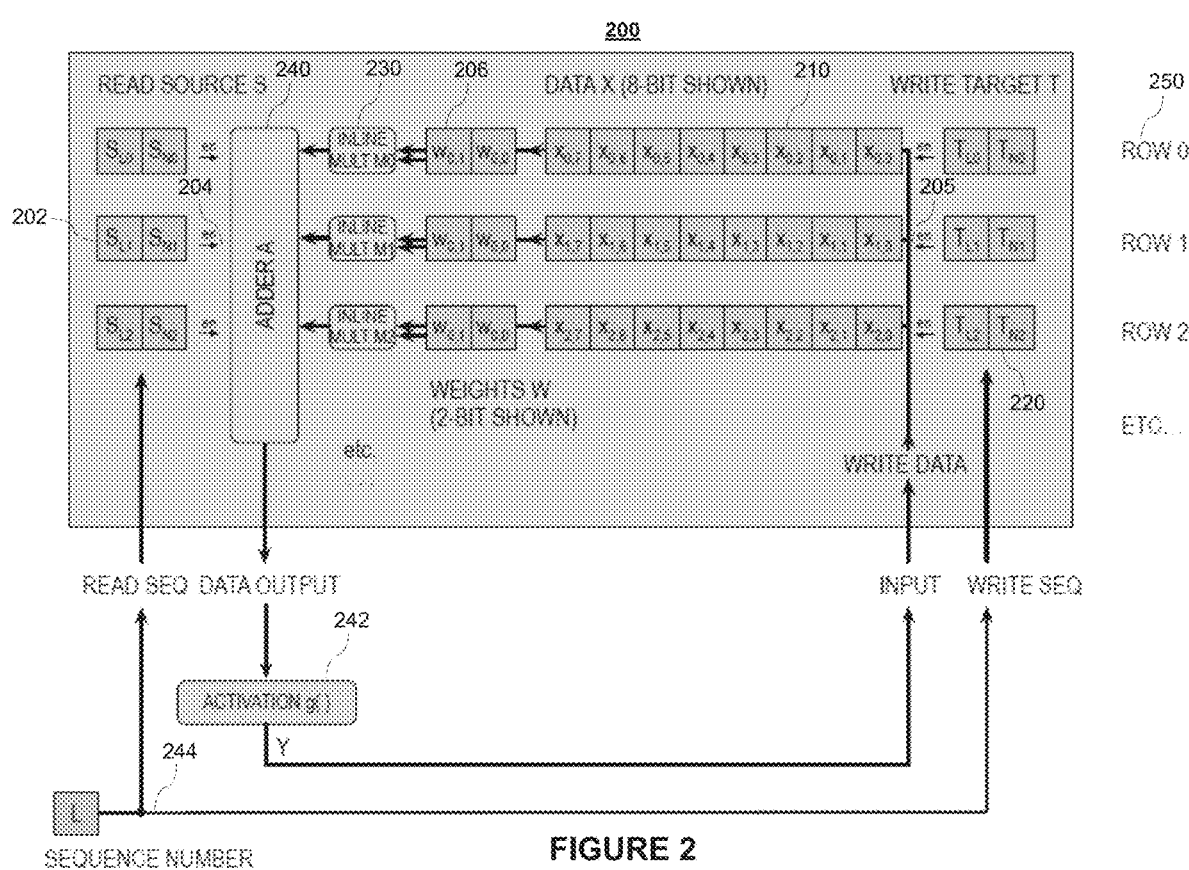
FIG. 2 illustrates an exemplary memory structure with inline multipliers and adder according to various embodiments of the present disclosure.

FIG. 2 illustrates an exemplary memory structure with inline multipliers and an adder according to various embodiments of the present disclosure. Memory structure 200 comprises memory elements S that store read sources 202, memory elements W that store weights 206, memory elements X that store data 210, memory elements T that store write targets 220, and output write enable signals, multipliers Mi 230, that are arranged in rows 250.

In embodiments, memory elements comprise circuitry, such as logic circuits that control memory structure 200. Memory structure 200 further comprises adder 240 that may be shared by rows 250.

It is noted that components, or modules, shown in diagrams are illustrative of exemplary embodiments of the invention and are meant to avoid obscuring the invention. It is also understood that throughout this document components may be described as separate functional units, which may comprise sub-units, but those skilled in the art will recognize that various components, or portions thereof, may be divided into separate components or may be integrated together, including integrated within a single system or component. For example, although activation function 242 and sequence number L 244 are shown outside of memory structure 200, e.g., to facilitate easy sharing of circuit resources, person of skill will appreciate that, in embodiments, activation function 242, sequence number L 244, and any number of other circuit components may be integrated into memory structure 200.

It is further noted that functions or operations discussed herein may be implemented as software components, hardware components, or a combination thereof. For example, memory structure 200 may be controlled by a state machine (not shown) that may be implemented as a hardware state machine or a software state machine.

In embodiments, multiple instances of memory structure 200 may be used and combined (e.g., in a column arrangement, using digital components, using modular components, etc.) to alleviate physical restrictions such as maximum dimensions for memory structure 200. Variations may implement any number of data elements X and/or multiple weight elements W per row 250.

In embodiments, memory structure 200 may be implemented using content addressable memory cells or similar circuitry that may use logic elements in any number and arrangement to control memory structure 200 and achieve the objectives of the present disclosure. In embodiments, the content addressable memory cells may use commonly available storage cells that store the actual 0 and 1 values, but that are subject to the interconnectivity of the content addressable memory cells.

One skilled in the art will recognize that the multipliers and adders may be implemented in different ways, for example using analog circuits, digital circuits, in-line within memory structure 200, or at the bottom of the memory array. An example of an analog implementation for multipliers and adders are the systems and methods disclosed in U.S. Provisional Patent Application No. 62/740,691 (Docket No. 20057-2258P), entitled "SYSTEMS AND METHODS FOR ENERGY-EFFICIENT ANALOG MATRIX MULTIPLICATION FOR MACHINE LEARNING PROCESSES," naming as inventors Sung Ung Kwak and Robert Michael Muchsel, and filed Oct. 3, 2018, which application is hereby incorporated herein by reference as to its entire content and for all purposes.

In operation, in response to a particular sequence number 244 that matches the content of memory elements of read source 202, read source 202 may cause enable signals 204 to be activated, e.g., to enable, activate, or control a read operation. Similarly, in response to the particular sequence number L 244 matching the content of memory elements of write target T 220, those memory elements may cause write targets 220 to output enable signals 205.

In embodiments, a controller (not shown in FIG. 2) controls multipliers 230 to compute the product of weights Wi 206 and data Xi 210, and controls adder 240 to compute the sum of the products Wi*Xi. The sequencing of operations is discussed next with reference to FIG. 3.

C. Sequencing

Figure 3:
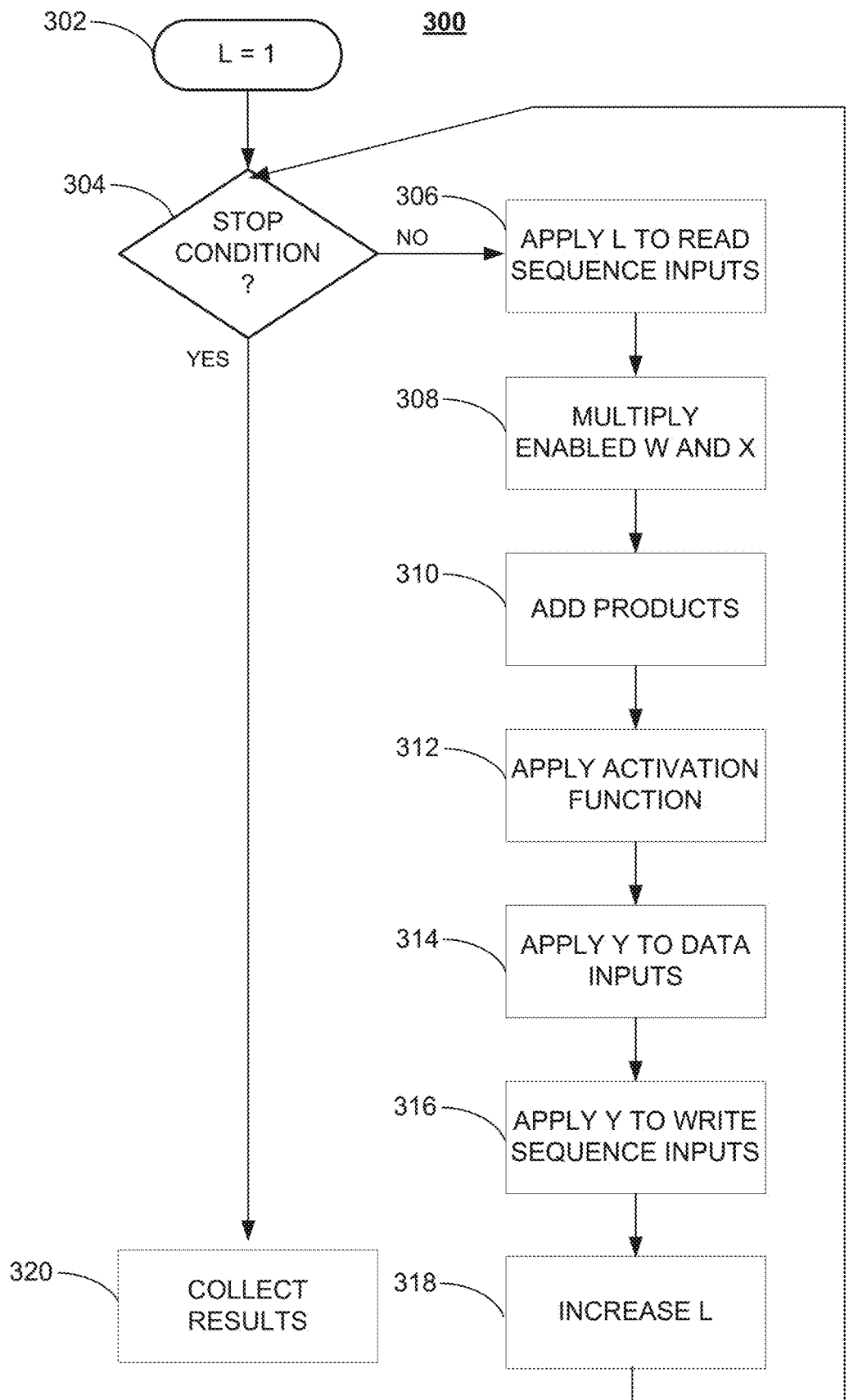
FIG. 3 is a flowchart of an illustrative process for energy-efficient data processing in accordance with various embodiments of the present disclosure by utilizing a memory structure as shown in FIG. 2

FIG. 3 is a flowchart of an illustrative process for energy-efficient data processing in accordance with various embodiments of the present disclosure by utilizing a memory structure as shown in FIG. 2. Process 300 begins at step 302 when the value of L is initialized, e.g., to L=1.

At step 304, it is determined whether a stop condition has been met. If so, process 300 may resume with step 320 where results are collected.

If, at step 304, a stop condition has not been met, then at step 306 a sequencer may apply a value, L, to a read sequence input. In embodiments, this causes read sources S that contain the value L to output their enable signal.

At step 308, the enabled data items X and weights W may be multiplied using multipliers Mi.

At step 310, the products may be applied to the adder A to obtain Y'.

At step 312, an activation function, g( ) may be applied to the output Y' of the adder A to obtain output Y.

At step 314, the sequencer applies the calculated output Y to the data inputs.

At step 316, the value L is applied to the write target inputs, e.g., via write sequence(s). In embodiments, this may cause all write targets T that contain the value L to output their enable signal such that, consequently, Y is written to the enabled data items X.

At step 318, L may be increased and process 300 may resume with step 304 to determine whether the stop condition has been reached.

It shall be noted that: (1) certain steps may optionally be performed; (2) steps may not be limited to the specific order set forth herein; (3) certain steps may be performed in different orders; and (4) certain steps may be done concurrently herein.

Figure 4:
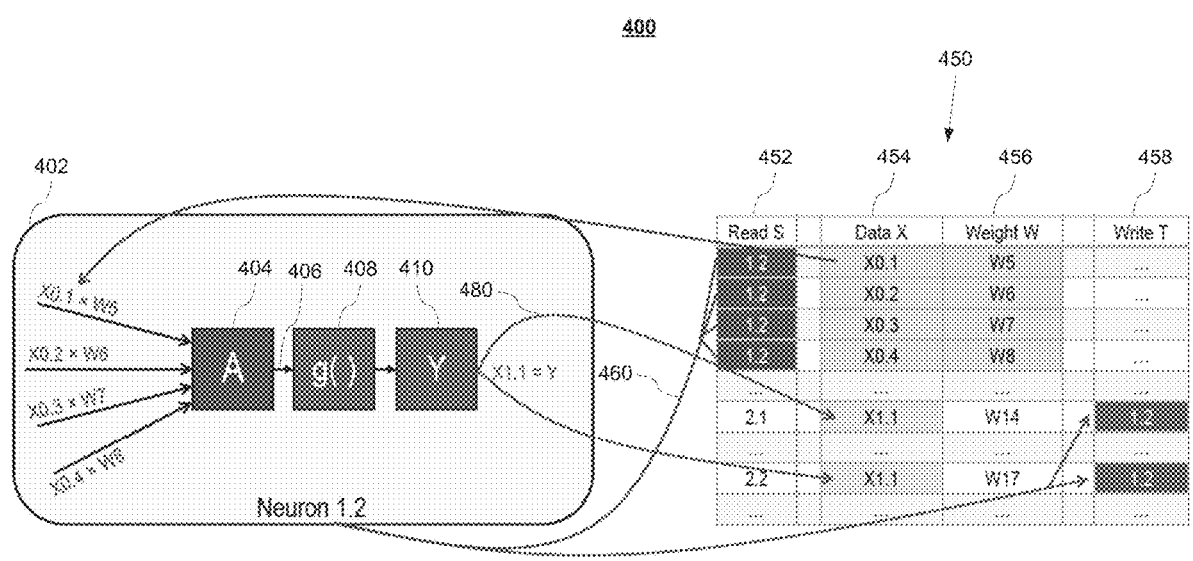
FIG. 4 is a data flow example that illustrates the process for energy-efficient data processing shown in FIG. 3.

FIG. 4 is a data flow example that illustrates the process for energy-efficient data processing shown in FIG. 3. The example illustrates a sequence involving neuron 1.2 shown in FIG. 1. As depicted in FIG. 4, sequencer 402 may, first, apply a value L, e.g., L=1.2, to the input of read sequence 452. In embodiments, this causes those read sources that contain the value 1.2, depicted in FIG. 4 as the first four rows of column 452 in table 450, to output their enable signals. As a result, the four enabled data items, depicted as X0.1, X0.2, X0.3, and X0.4 in column 454, and weights W, depicted as W5, W6, W7, W8 in column 456, are multiplied, e.g., by a multiplier circuit illustrated in FIG. 2.

In embodiments, the products (X*W) of the multiplication may then be input to adder 404 that computes X0.1*W5+X0.2*W6+X0.3*W7+X0.4*W8 to output an intermediary result 406. In embodiments, output 406 of adder 404 may be provided to activation function 408 that outputs the result 410 of this process as of this calculation as Y. In embodiments, sequencer 402 applies 460 the calculated result 410 (e.g., Y=X1.1) to the data input, as indicated in column 454, and applies 470 the value L=1.2 to the write target input, as indicated in column 458. In embodiments, this causes write targets T that contain the value L=1.2 (shown in column 458) to output their enable signal, and consequently result 410 may be written 480 to the enabled data items X, as indicated in column 454. Finally, the value of L is increased, e.g., to L=1.3, and the sequence is repeated until a stop condition is met.

One of skill in the art will appreciate that the illustrated multiplication operations may be performed in parallel and in place, such that data does not have to be moved far to be applied to adder 404, thus, resulting in an energy-efficient arrangement. In embodiments, the sequencing process may be implemented using analog circuitry that, advantageously, further increases energy efficiency.

D. Examples

It is noted that the following examples, values, and results are provided by way of illustration and are obtained under specific conditions using a specific embodiment or embodiments; accordingly, neither these examples nor their results shall be used to limit the scope of the current disclosure.

FIG. 5 is a tabular listing of exemplary contents of a memory structure according to various embodiments of the present disclosure, such as the memory structure shown in FIG. 2. The exemplary values are used to illustrate examples for a fully connected neural network, e.g., the network shown in FIG. 1. For each row entry in table 500 in FIG. 5 shows values for (1) read source, S, 510; (2) data item, X, 520; (3) one or more weights, W, 530 or bias items 530; and (4) write target, T, 540. It is note that for clarity of the description, random values are shown for weights 530.

As previously mentioned with respect to fully connected networks, given a value for a read source S, all memory elements with a matching value may be activated to enable a read operation; similarly, given a value for a write target T, all memory elements with matching write target T value may be activated.

In FIG. 5, values listed in read source 510 and write target 540 are named in the format "layer.number," e.g. "2.1.," where "layer" refers to the neuron layer. It is noted that, as with other numbering schemes herein, this numbering is arbitrary.

Entries denoted as "0.0" in write target 540 may represent memory that has not been written to or have been initialized as having a "zero" value. Table 500 in FIG. 5 shows an initial state of the data structure before data is loaded. In embodiments, such entries may be used for bias weights that may be preloaded into a memory structure. The data for bias entries 530 may also be preloaded into the memory structure, here as having the value 1.000.

Figure 6:
FIG. 6 illustrates an exemplary tabular listing for FIG. 5 after a data loading step has been performed.

The entries 0.1 through 0.4 in the write target 540 denote targets for input data, such as sensor data. The entries associated with the values 4.1, 4.2, and 4.3 in read source 510, i.e., the entries 3.1, 3.2, and 3.3 in write target 540 may be used to collect the output data of the last fully connected layer. FIG. 6 illustrates an exemplary tabular listing for FIG. 5 after a data loading step has been performed.

In FIG. 6 it is assumed that input data xi, here, having the values $x_1=0.41$, $x_2=0.52$, $x_3=0.63$, and $x_4=0.74$, are loaded into locations addressed by 0.i in write target 640. The changed data is highlighted in table 600. After the data loading step, in embodiments, computations may commence by selecting, for each neuron $N_{j.k}$, all read sources 610 addressed by j.k to output, for each neuron $N_{j.k}$, the sum of the individual products passed through an activation function as follows:

$$Y_{j.k} = \text{output }(N_{j.k}) = g(\Sigma_{S=j.k}\text{data}\cdot\text{weight}) \quad \text{(Eq. 2)}$$

For $N_{1.1}$ in the example above, the Eq. 2 may be written as:

$$Y_{j.k} = g(0.41\cdot-0.002849+0.52\cdot-0.017828+0.63\cdot0.006862+0.74\cdot-0.000359+1.000\cdot-0.061022)$$

Assuming that g( ) is a sigmoid function, Eq. 2 yields g(−0.06740325)=0.483156.

In embodiments, the activated computation result is stored in those locations that have a write target 640 of j.k. In the example above, for j.k=1.1, the data structure may now be represented as in FIG. 7, in which the changes resulting from the activation function are highlighted.

In embodiments, this process may be repeated for all remaining j.k, here, $N_{1.2}$, $N_{1.3}$, $N_{2.1}$, $N_{2.2}$, $N_{3.1}$, $N_{3.2}$, and $N_{3.3}$. The data values from the last layer (layer 4 in the example in FIG. 1) may then be collected, e.g., by software, and used directly or serve as input for a classification function, e.g., softmax.

E. Activation Function Lookup Table

Several known activation functions, such as sigmoid, ReLU, Leaky ReLU, and ELU, are commonly used with relatively good results. In embodiments, in order to save on compute time and to allow flexibility, a programmable lookup table may be employed. If, for example, data vales are expressed as 8-bit integers, a table with 256 entries may sufficiently describe any possible activation function. In embodiments, hardware accelerators may be used for ReLU or other activation functions.

F. Optimizations

Figures 8, 9:
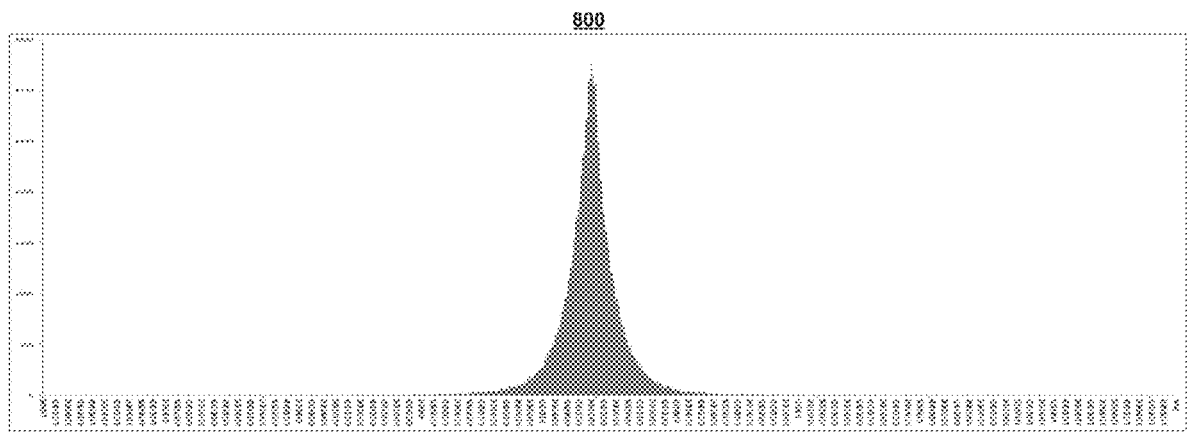
FIG. 8 shows a prior art weight distribution.
FIG. 9 illustrates exemplary discrete weights in accordance with embodiments of the present disclosure.

In the examples above, both data and weights were displayed in floating point format. In embodiments, data may be expressed as integers, e.g., 8-bit integers, and the size of weights may be severely reduced by "quantizing" them. In embodiments, this is accomplished by applying a process to a weight distribution, such as weight distribution 800 in FIG. 8, which illustrates a typical weight distribution, in order to derive quantized weights. For example, given weight distribution 800 in FIG. 8 and the following seven discrete weights in table 900 in FIG. 9, the original weights in distribution 800 could be rounded to the nearest discrete weight, such that, after rounding, the data structure may look like that in FIG. 10.

A person of skill in the art will appreciate that rounding is only one simple way to quantize weights. There is active research in the art that aims to improve the process and means of developing machine learning algorithms that use quantized weights. Accordingly, any known process in the art may be used to obtain or derive quantized weights. One of skill in the art will further appreciate that, in embodiments, data structure entries having a weight of 0.0 may advantageously be removed during the construction of the network such as to 1) reduces storage requirement, 2) eliminates a significant number of computations, and 3) reduce power consumption as overall data movement is reduced.

FIG. 11 illustrates a simplified example in which rounding results in the elimination of much of the computations that have to be performed. While, in practice, the reduction may be may not so extreme for a large network, it might still be considerable. It is noted that some optimizations may not necessarily save computation time, but rather reduce storage requirements. For example, while matching rows for a neuron may be processed in parallel, the sequence of neurons may be computed sequentially. Further, if no weight sharing (discussed next) is used, then there may be no need to encode 0.0 weights at all.

G. Weight Sharing

The basic data structure shown above comprises Read Source, Write Target, and an associated Weight. In embodiments, implementation options allow for multiple weights per data structure entry. As a result, if, e.g., two weights are used, then the data structures for $N_{k,1}$ and $N_{k,1+1}$ may be combined. It is understood that once weights are combined in this manner, it should be possible to encode a 0.0 weight. It is further understood, that inefficiencies may be introduced if the node count per layer is not evenly divisible by the number of shared weights (e.g., $N_{1,3}$ and $N_{3,3}$ in the example in FIG. 12).

H. Ternary Read Sources

In embodiments, similar to the concept of weight sharing, a plurality of entries that have the same data, (rounded) Weights, and Write Target, may be combined, e.g., by expressing address bits in the Read Source as "don't care." In this flexible approach, the Read Source may then match regardless of whether the particular applied address bit is 0 or 1. Several of the ternary elements may be implemented, for example, 6-bits.

Since, as mentioned previously, the numbering for Read Source and Write Target may be arbitrary, and the order of execution within a layer should not matter in most circumstances when no recurrent network is used, the data structure may be re-sorted to yield significant savings. For example, a partial structure (after removing 0-weights) may provide the results in FIG. 13. It is noted that, similar to weight sharing, Ternary Read Sources do not necessarily save computation time.

In embodiments, sorting this structure by Write Target-Weight-Data and adding a binary representation of the decimal Write Target may provide the results in FIG. 14. In embodiments, replacing Read Source address bits with 'X' without renumbering yields a smaller structure shown in FIG. 15. In embodiments, neurons may be renumbered (not shown), such that the first two table entries may be combined.

I. Column Weights

Assuming a limited number of discrete weights, instead of computing the sum of products as:

$$y_{j,k} = \Sigma_i x_i \cdot w_i \quad \text{(Eq. 3)}$$

in embodiments may use the following expression:

$$y_{j,k} = w_0 \cdot \Sigma_m x_m + w_1 \cdot \Sigma_n x_n + w_2 \cdot \Sigma_p x_p + \quad \text{(Eq. 4)}$$

Advantageously, this approach allows for parallel computation of terms that share inputs, but that use different weights. This embodiment comprises a plurality of memory structures ("columns") having elements that each may comprise, e.g., (1) a read source S, (2) a data item X, and (3) a write target T. Further, each column C may be associated with a weight $W_C$, as shown in FIG. 16, which illustrates an exemplary memory structure that utilizes column weights, according to various embodiments of the present disclosure.

Figure 16:
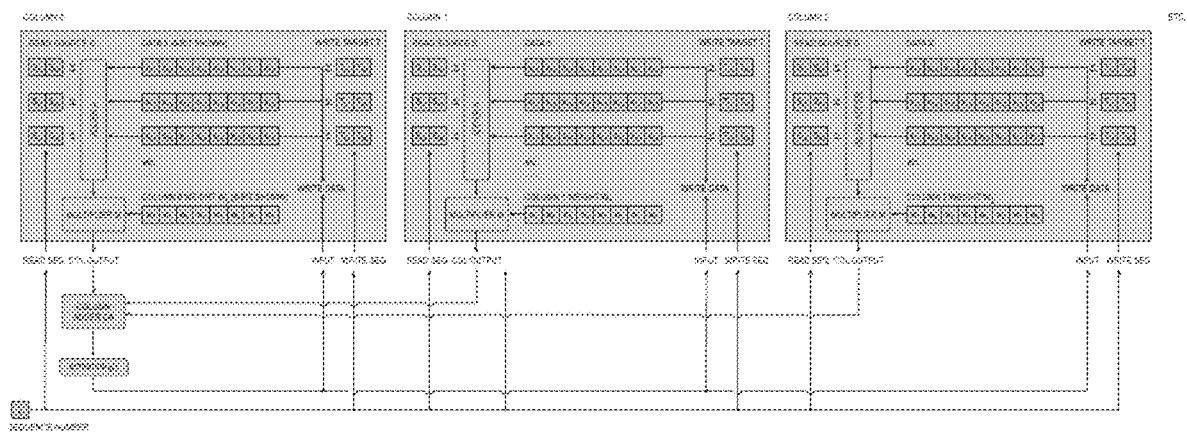
FIG. 16 illustrates an exemplary memory structure that utilizes column weights, according to various embodiments of the present disclosure.
Figure 17:
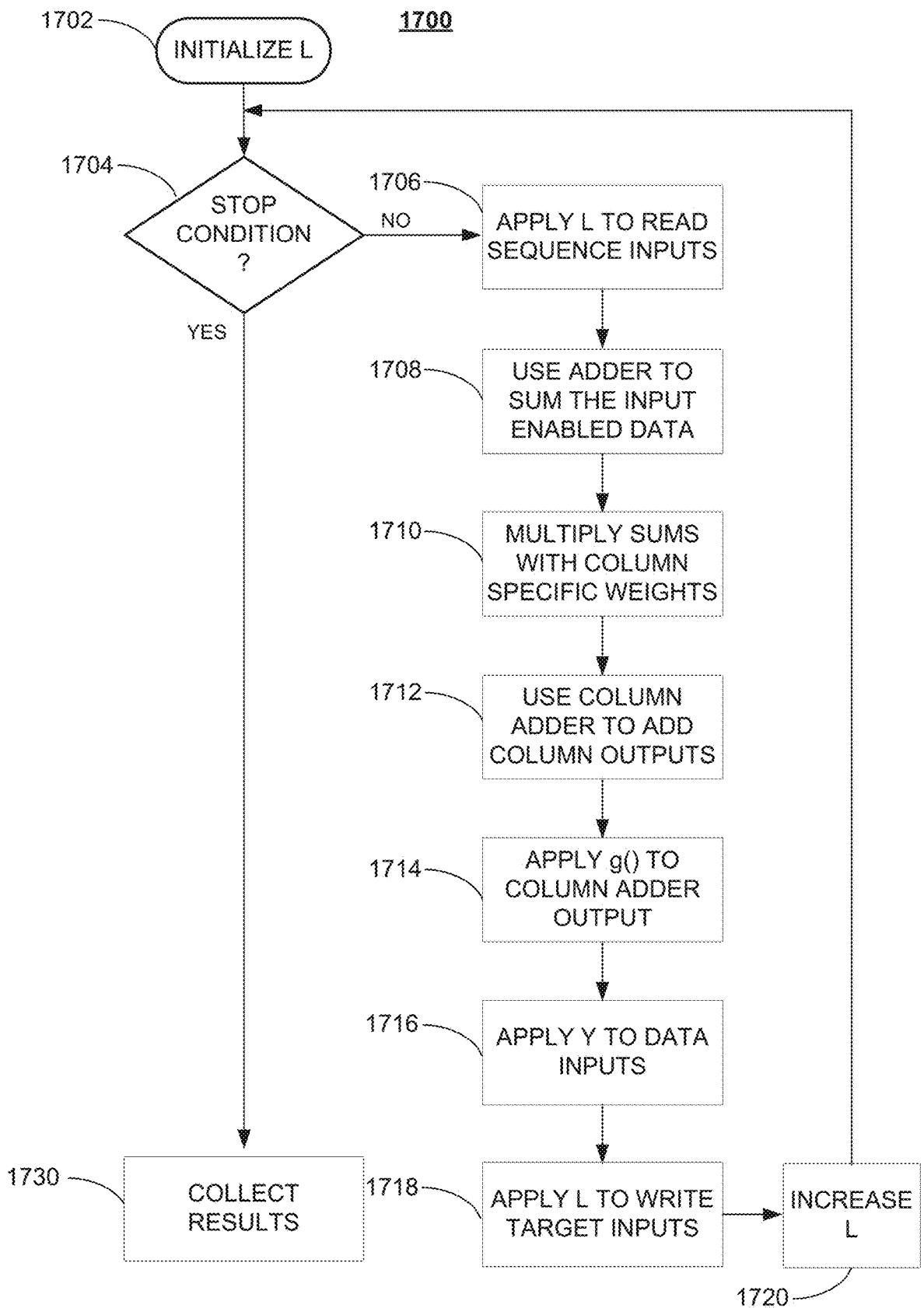
FIG. 17 is a flowchart of an illustrative process for energy-efficient data processing in accordance with various embodiments of the present disclosure by utilizing a memory structure as shown in FIG. 16.

FIG. 17 is a flowchart of an illustrative process for energy-efficient data processing in accordance with various embodiments of the present disclosure by utilizing a memory structure as shown in FIG. 16. Process 1700 begins at step 1702 when the value of L is initialized, e.g., to L=1.

At step 1704, it is determined whether a stop condition has been met. If so, process 1700 may resume with step 1730 where results are collected.

If, at step 1704, a stop condition has not been met, then, at step 1706, the sequencer may apply a value, L, to a read sequence input. In embodiments, this causes read sources S that contain the value L to output their enable signal.

At step 1708, the enabled data items X may be summed by an adder that outputs sums that, at step 1710, are multiplied with the column weights W, e.g., by using multipliers M, to obtain column-specific outputs.

At step 1712, the column outputs are added by a column adder.

At step 1714, the outputs of the column adder is processed through an activation module that may apply an activation function, g(), to the column adder output to obtain output Y.

At step 1716, the sequencer applies the calculated output, Y, to the data inputs.

At step 1718, the value L is applied to the write target inputs. In embodiments, this may cause all write targets T that contain the value L to output their enable signal such that Y is written to the enabled data items X.

At step 1720, L may be increased and process 1700 may resume with step 1704 to determine whether the stop condition has been reached.

It is noted that, depending on the particular embodiment, (1) certain steps may optionally be performed; (2) steps may not be limited to the specific order set forth herein; (3) certain steps may be performed in different orders; and (4) certain steps may be done concurrently herein. For example, for a plurality of columns, some of the steps (e.g., all steps 2 and all steps 3) may be performed in parallel.

Figure 18:
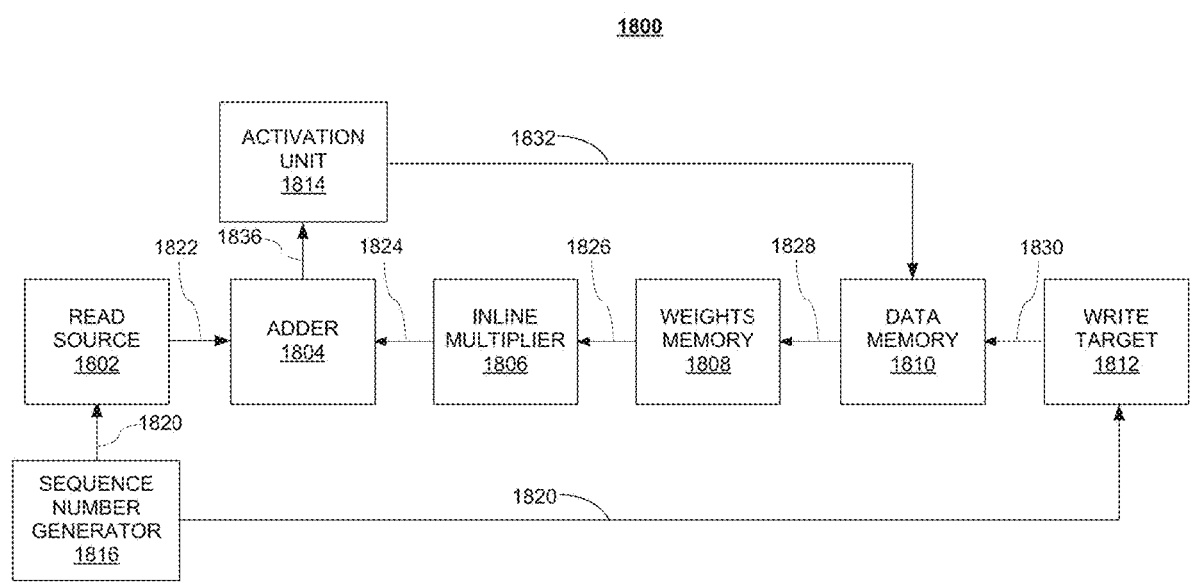
FIG. 18 illustrates a simplified system utilizing a memory structure according to various embodiments of the present disclosure.

FIG. 18 illustrates a simplified system utilizing a memory structure according to various embodiments of the present disclosure. Sequencer 1800 comprises read source 1802, adder 1804, inline multiplier 1806, weights memory 1808, data memory 1810, write target 1812, activation unit 1814, and sequence number generator 1816.

In operation, read source 1802 receives sequence number 1820 from sequence number generator 1816, e.g., until a stop condition has been reached. If the sequence number 1820 matches a content of a memory element in read source 1802, then read source 1802 outputs an enable signal 1822 that enables data in weights memory 1808 and data memory 1810 to be multiplied by inline multiplier 1806 to generate products 1824 that are then added by adder 1804 that computes the sum of products 1824. In addition, memory elements in in write target 1812 whose content matches sequence number 1820 may cause write target 1820 to output enable signals 1830.

In embodiments, output 1836 of adder 1804 is provided to activation unit 1814 that applies an activation function to products 1824 to generate output 1832 that may then be fed back to the input of data memory 1810 to be written according to enable signals 1830 generated by write target 1812, in response to receiving sequence number 1820. Finally, sequence number generator 1816 may increment sequence number 1820 and provide a new sequence number to read source 1802 to close the loop.

Figure 19:
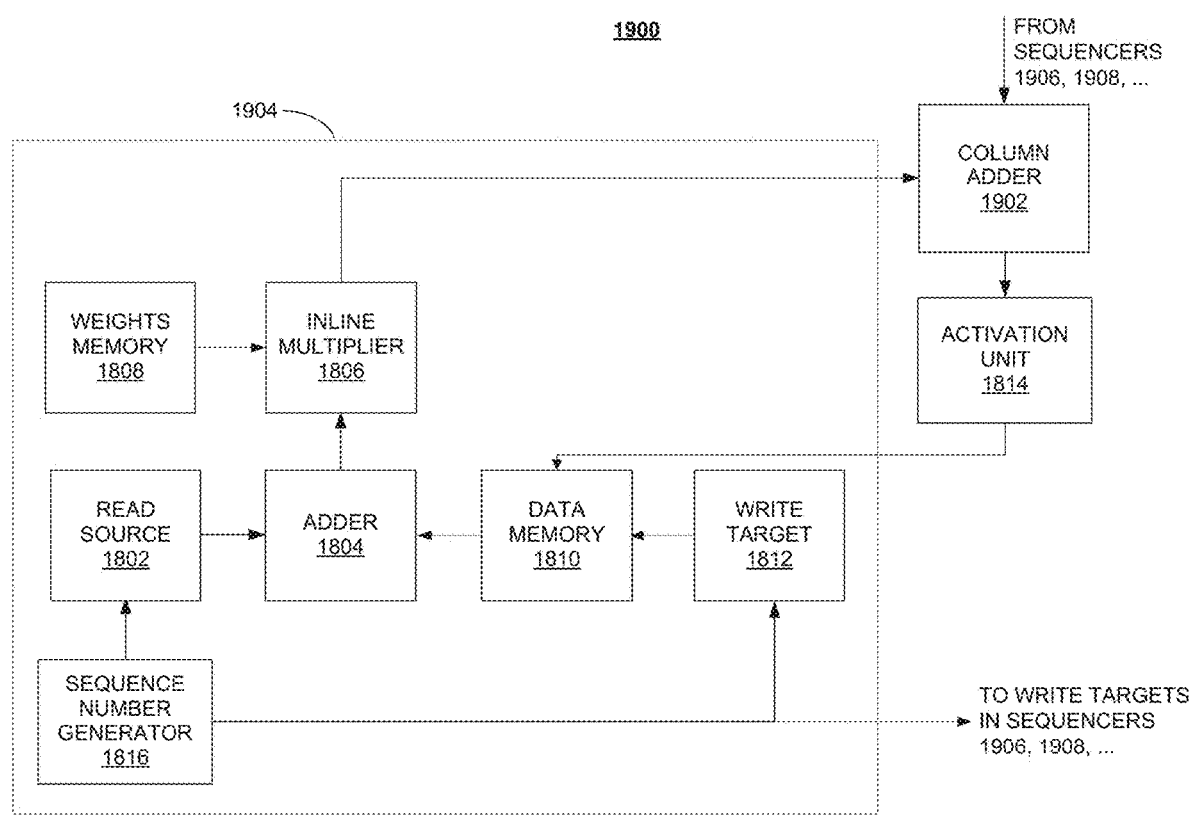
FIG. 19 illustrates an alternate system utilizing a memory structure that uses column weights according to various embodiments of the present disclosure.

FIG. 19 illustrates an alternate system utilizing a memory structure that uses column weights according to various embodiments of the present disclosure. For clarity, components similar to those shown in FIG. 18 are labeled in the same manner. For purposes of brevity, a description or their function is not repeated here. System 1900 comprises sequencer 1904 that is similar to sequencer 1800 in FIG. 18. System 1900 in FIG. 19 further comprises column adder 1902, e.g. a column adder, such as those illustrated in FIG. 16 that may be coupled to any number of additional sequencers (not shown in FIG. 19) that share column adder 1902 and activation unit 1804. Similar to FIG. 16, sequence number generator in FIG. 19 may be coupled to any number of additional sequencers.

J. System Embodiments

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and / or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and / or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for energy-efficient data processing, the method comprising:
   initializing a value;
   using a sequencer to apply the value to a read sequence input to cause a read source that contains the value to output a first enable signal, the first enable signal enabling a data item;
   using a multiplier to multiply the enabled data item with a weight to obtain a product;
   applying the product to an adder to obtain a result;
   applying an activation function to the result to obtain an output;
   applying the output to a data input;
   applying the value to a write target input that in response to containing the value, outputs a second enable signal, the second enable signal causing the output to be written to the data item;
   increasing the value; and
   determining whether a stop condition has been satisfied.

2. The method according to claim 1, wherein the multiplier is an inline multiplier that performs in place calculations.

3. The method according to claim 1, wherein the sequencer comprises a state machine.

4. The method according to claim 1, wherein the multiplier performs parallel calculations.

5. The method according to claim 1, wherein the activation function is at least one of a sigmoid function, a ReLU function, a leaky ReLU function, or an ELU function.

6. The method according to claim 1, wherein the adder is shared by a plurality of weights.

7. The method according to claim 1, wherein the adder utilizes a hardware accelerator.

8. The method according to claim 1, wherein the adder shares a plurality of weights.

9. The method according to claim 1, wherein the sequencer further comprises a content addressable memory device that is used to identify data items and weights.

10. A sequencer for energy-efficient data processing, comprising:
    a read source that receives a value, in response to the value matching a content of the read source, the read source enabling a read operation;
    a write target that receives the value, in response to the value matching a content of the write target, the write target enabling an output to be written into a data item;
    one or more weights;
    a multiplier that multiplies the enabled data item with the one or more weights to obtain a product;
    an adder that, in response to the read source enabling a read operation, uses the product to obtain an intermediary result; and
    an activation function that, in response to receiving the intermediary result or a value derived from the intermediary result, generates the output.

11. The sequencer according to claim 10, further comprising increasing the value until a stop condition has been satisfied.

12. The sequencer according to claim 10, wherein the sequencer comprises one or more analog components.

13. The sequencer according to claim 10, wherein the sequencer comprises a content addressable memory that is used to identify data items and weights.

14. The sequencer according to claim 10, wherein the sequencer comprises a state machine.

15. The sequencer according to claim 10, wherein the one or more weights are quantized to reduce the size of the one or more weights.

16. The sequencer according to claim 15, wherein the one or more weights are quantized by rounding the one or more weights.

17. The sequencer according to claim 10, further comprising combining two or more weights for two different data structures such that the two or more weights are shared among two or more data structures that comprise the read source, the write target, and the one or more weights.

18. The sequencer according to claim 17, combining comprises discarding address bits associated with the read source.

19. The sequencer according to claim 10, further comprising column weights that are applied to column multipliers to generate column-specific outputs.

20. The sequencer according to claim 19, further comprising a column adder that generates the value derived from the intermediary result by adding the column-specific outputs.

* * * * *